UNITED STATES PATENT OFFICE.

EDWARD ARMSTRONG, OF BROOKLYN, NEW YORK.

COMPOSITION OF MATTER.

1,041,229.  Specification of Letters Patent.  Patented Oct. 15, 1912.

No Drawing.  Application filed February 14, 1911. Serial No. 608,555.

*To all whom it may concern:*

Be it known that I, EDWARD ARMSTRONG, a citizen of the United States, residing at Brooklyn, in the county of Kings and State of New York, have invented certain new and useful Improvements in Compositions of Matter, of which the following is a specification.

This invention relates to a composition of matter and its object is to provide a substitute for wood used for wood cuts, wood engraving and wood type used in the printer's trade.

Another object of the invention is to provide a substitute for rubber tympan or blankets used on printing presses.

Another object of the invention is to provide a material for either of the purposes above mentioned which may be used over and over again times without number, after having been discarded, simply by remelting and recasting.

With the above and other objects in view I have invented the following composition of matter which I have found from actual and most successful experiments will do just what I claim for it.

By compounding the ingredients to be stated a new article of manufacture will be produced. For the purpose of illustration I will state the ingredients and the proportions necessary to attain two degrees of hardness of the material formed, it being understood that the proportions may be varied without sacrificing any of the advantages derivable from the compound to be described.

The material for printing cuts may be compounded as follows having the consistency required for molding:—32 parts of gelatin or glue, 11 parts of wax of any color, 7 parts of tannic acid, 27 parts of milk or water, 9 parts of linseed oil, 4 parts of banana oil, 10 parts of molasses.

To obtain an extra hard material the proportions will be slightly varied as follows: 36 parts of gelatin or glue, 12 parts of wax of any color, 8 parts of tannic acid, 24 parts of milk or water, 8 parts of linseed oil, 4 parts of banana oil, 8 parts of molasses.

While the use of the above ingredients in the proportions stated or thereabouts is sufficient to compound the material, one or more of the ingredients may be omitted and equivalents substituted working equally well. By using banana oil for example, I find it a reducer and a drier and it also helps to make the compound waterproof, but it may be eliminated without detriment. Similarly, water may be used without milk, or milk without water, although by using skimmed milk it assists in making the compound waterproof.

The present method of making large wood cuts from which posters and the like are printed is to carve the wording and illustrations, ornaments, illuminating and designs, into the upper surface of large blocks of wood, which after the one job is completed, are of no further use. This constant destruction of good material is very expensive and greatly increases the cost of such work.

With the use of my composition, the same wooden bases and the carved compound may be used as many times as desired, thus saving a very large expense.

I compound the ingredients in the proper manner and form sheets of the material about one-eighth to one-fourth of an inch thick. These sheets are tacked on or otherwise secured to wooden bases and the surface of the material may then be carved in the same manner that wood cuts are carved. After these cuts have been discarded the carved material may be separated from the wooden bases and recast and remounted upon the same bases, after which it can again be carved. This operation may be repeated continually without affecting the quality of the material.

I claim and desire to secure by Letters Patent,

1. A composition of matter composed of a glue, wax, tannic acid, milk, linseed oil, banana oil, and molasses in the proportions stated.

2. A composition of matter composed of gelatin, wax, tannic acid, water linseed oil, banana oil, and molasses in the proportions stated.

In testimony whereof I affix my signature in presence of two witnesses.

EDWARD ARMSTRONG.

Witnesses:
JOSEPH DUGAN,
CORNELIUS DOHERTY.